United States Patent Office 3,421,361
Patented Jan. 14, 1969

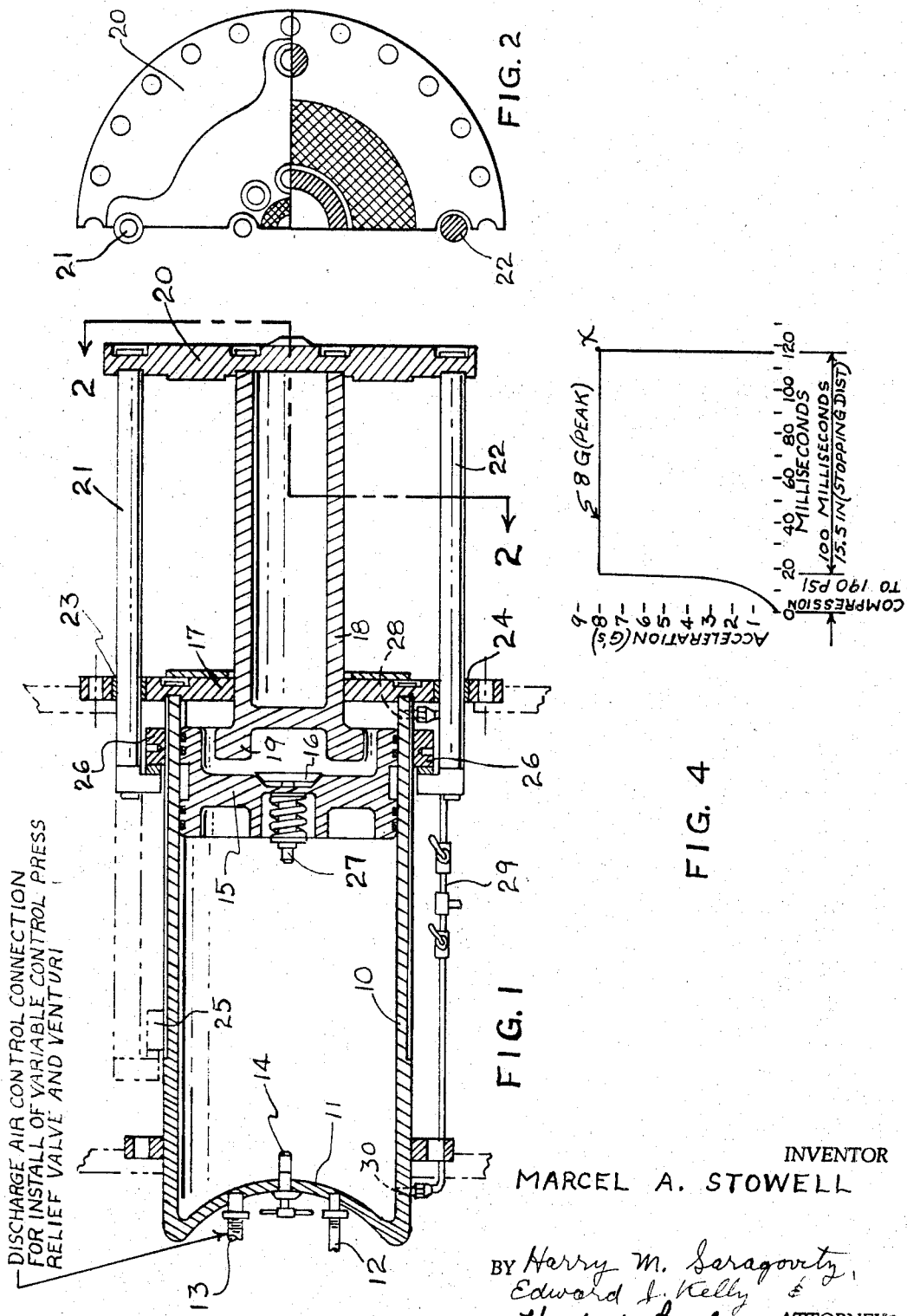

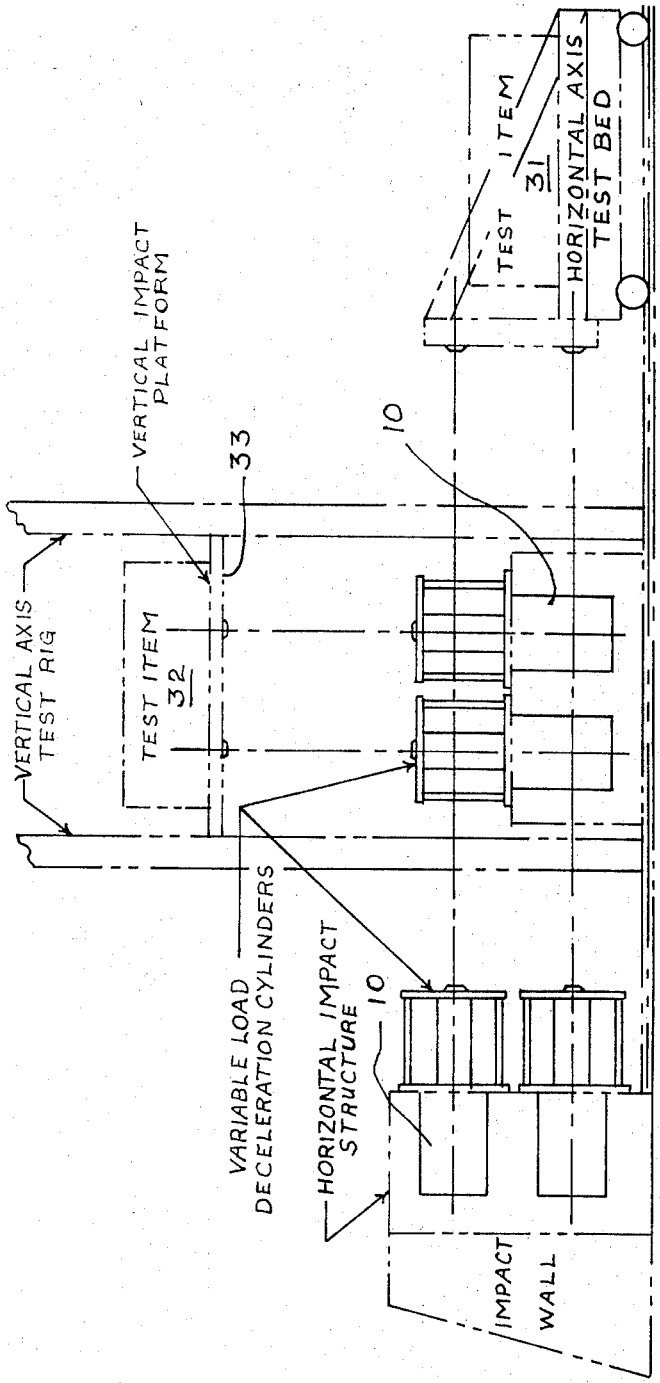

3,421,361
VARIABLE LOAD DECELERATION MECHANISM
Marcel A. Stowell, Petersburg, Va., assignor to the United States of America as represented by the Secretary of the Army
Filed July 6, 1966, Ser. No. 563,655
U.S. Cl. 73—12                6 Claims
Int. Cl. G01n 3/30

ABSTRACT OF THE DISCLOSURE

Apparatus is provided for decelerating a moving mass at a desired rate to obtain a desired G-force. A cylinder-piston is precharged with a fluid. The moving mass presses on the piston while the cylinder is held stationary. Escape of the fluid is restricted as desired to resist movement of the piston. Therefore, the G-force acting on the mass during deceleration may be increased by restricting fluid escape, or decreased by allowing less-restricted escape.

---

The invention described herein may be manufactured and used by or for the Government, for governmental purposes, without the payment of any royalty thereon.

This invention relates to a mechanism capable of controlling a peak G-force for a specific interval of time on a moving mass which is decelerated to a stop.

It is the object of this invention, by providing adjustments to the mechanism, to obtain variable G-forces for variable increments of time on various masses under test by merely varying the initial impact velocity of the moving mass.

Most systems currently employed in this category are complicated and expensive and generally do not give good wave patterns.

This device provides a more or less rectangular shock wave pattern by the use of accelerometers and a scope, provided the mechanism is of good design and accurate calibrations are made. The good design, proper selection of materials and keeping the components of the system above the expected resonance will result in a good shock wave pattern.

It is necessary to compute pre-test data by known equations for the purpose of calibrating the system for a known requirement prior to initial trial test. However, the instrument calibration time for a specific test will be substantially less than is now possible with any currently available deceleration test method.

This deceleration mechanism is designed so that a predetermined air pressure injected into the cylinder will impose a known force on the piston and since a given mass impacting the piston at a specific velocity will impose a known G-force for a specific increment of time when brought to a complete stop in a specific distance by the opposing pressure. Thus, the basic principle of this invention is based on the use of a pressure cylinder and piston, which when supplied with a known air pressure, will impose the necessary force on the piston to produce G-forces as required for a specific test. The design incorporates a method of controlling the stopping distance such that a given mass may be decelerated to a complete stop in a known increment of time, thus imposing a predetermined G-force.

In the drawings:

FIGURE 1 is a longitudinal cross-section of the deceleration cylinder;

FIGURE 2 is a sectional view of the cylinder taken as line II—II of FIGURE 1;

FIGURE 3 is an elevational illustration of the operation of the mechanism on either a horizontal axis or a vertical axis; and FIGURE 4 is a chart showing the wave pattern of the acceleration (G's) plotted against the time increment in milliseconds.

In FIGURE 1 is shown the pressure cylinder 10 having a closure 11 at one end that is provided with an air inlet 12, a discharge air connection 13 and an adjustable impact trip valve 14 in the center thereof. Within the cylinder 10 is a floating circular piston 15 with an opening in the center for an impact pressure equalizer valve 16 adapted to engage the impact trip valve 14 at the end of the piston stroke. The opposite end of the cylinder 10 is provided with a removable closure 17 having an opening in the center for the reception of the slidable piston rod 18 which is provided with a striking plate 19 on the end within the cylinder. The opposite end of the piston rod 18 is attached to an impact plate 20 and the movement of both is maintained in axial alignment by the rods 21 and 22 which are slidable through the respective guides 23 and 24 and whose movement is limited by the adjustable stop ring 26. An example of a location to which ring 26 may be adjusted is illustrated at 25, in broken lines. Broken lines are also used to illustrate the position of rod 21 where it would be stopped if ring 26 were adjusted to the broken-line position illustrated at 25. The spring-loaded equalizer valve 16 in the piston 15 is provided as a means by which bounce-back or oscillations can be dampened upon completion of a deceleration cycle. This spring-loaded equalizer valve 16 is provided with a strike dowel 27 adapted to engage the impact trip valve 14 and is adjustable so that the valve 16 will open when the piston 15 has reached its limit of travel, thus opening the valve 16 and allowing the remaining air pressure in the cylinder to equalize on each side of the piston to dampen the tendency to oscillation and insure a smoother shock wave pattern. The striking plate 19 is cup-shaped to permit the air pressure released by the valve 16 to pass around the periphery of the striking plate 19 and through the outlet 28 to the air bleed manifold 29. This manifold 29 is also connected by the outlet 30 to the cylinder 10 on the other side of the piston 15. This arrangement provides a means by which the cylinder can be bled of air pressure on either side of the piston to facilitate positioning and movement of the piston as well as permitting the removal of any condensation that may collect in the cylinder. The discharge connection 13 permits control by a variable pressure relief valve and venturi (not shown) to provide a means by which the quantity and pressure of the escaping air can be controlled during the entire deceleration cycle. The adjustable relief valve is capable of metering the volume of the compressed air through a venturi, and maintains a specific pressure throughout the cycle. When properly set, this valve will control the escape of air when a given force is imposed on the impact plate, such that the escape of air will coincide with the rate of the deceleration force exerted, thus maintain a specific peak G-force throughout the deceleration cycle until all the energy, required to bring a mass to a standstill, has been expended.

For operation, the mechanism is designed so that as high a pressure as is practical may be used for any particular system in order to keep the cylinder diameter at a minimum, giving consideration to weight, strength, and the maximum impact loads anticipated. For most practical applications, more than one cylinder in series is recommended for a system. This will keep individual cylinders of a particular system to a minimum size in addition to stabilizing side load effects which may result from improper centering and the different centers of gravity of the various test specimens. The length of the cylinders should be sufficient to allow for the greatest stopping distance anticipated plus at least 25%. The additional length will provide the necessary volume required to produce a practical pressure on each side of the piston when the piston has reached its limit of travel and the equalizer valve 16 is tripped.

Since the relief valve (not shown) is to be set to actuate at a specific pressure, the initial air pressure injected into the cylinder will have to be somewhat less than this setting so that a small amount of travel, upon impact, will be required to compress the air to the desired value. This will be of benefit to the system since this extra travel, for possibly 10 to 20 milliseconds or as desired, will provide an initial impact damper or shock absorber zone before attaining the peak G-force where the relief valve will be actuated.

FIGURE 3 shows the positioning of the mechanism utilizing one or more cylinders 10 with test load 31 capable of moving on a horizontal axis. There is also shown an alternative arrangement where the test load 32 is placed on a platform 33 and is designed to be dropped on a vertical axis contacting the battery of the cylinders 10 at the bottom of the drop.

Having described the operation of this deceleration mechanism, it may be utilized to make the following determinations:

EXAMPLE 1

A 2000 gal. capacity fuel cell with a gross weight of 15,500 lbs. is to be subjected to a force of 8 G's for 0.1 second. The weight of the deceleration test rig is 2,500 lbs. and the velocity at impact (1) the force imposed (2) and the required stopping distance (3) may be calculated as follows:

$$V = V_o + at$$
$$o = V_o + at$$
$$\therefore V_o = at$$
$$= (8)(32.2)(0.1)$$
$$= 25.76 \text{ ft./sec.} = 17.56 \text{ mi./hr.} \quad (1)$$
$$F = ma$$
$$= W \cdot a/g$$
$$= 15,500 + 2,500(8)$$
$$= 144,000 \text{ lbs.} \quad (2)$$
$$S = V_o t^2 + \frac{1}{2} a t^2$$
$$= (8)(32.2)(0.1)^2 - \frac{1}{2}(8)(32.2)(0.1)^2$$
$$= 1.288 \text{ ft.} = 15.46 \text{ inches} \quad (3)$$

where:

V = Final velocity (assumed to be "0")
$V_o$ = Initial velocity at impact (ft./sec.)
S = Required stopping distance (ft.)
t = Time required to stop (sec.)
a = Acceleration (ft./sec.$^2$)
F = Force (lbs.)
g = Acceleration due to gravity (ft./sec.$^2$)
G = a/g

EXAMPLE 2

Assuming the use of four deceleration cylinders and a pressure of 190 p.s.i. with a required stopping distance of 15.5 inches, the diameter of the cylinder is calculated as follows:

$$\text{Force on each piston} = \frac{144,000}{4} = 36,000 \text{ lbs.}$$

$$\text{Area} = \frac{\text{Force}}{\text{Press.}} = \frac{36,000}{190} = 189.4 \text{ in.}^2$$

Area of cylinder = $\pi r^2$ $$r^2 = \frac{A}{\pi} = \frac{189.4}{3.14}$$

$$r = \sqrt{60.31} = 7.77 \text{ inches}$$

$$d = 15.54 \text{ inches}$$

EXAMPLE 3

Assuming an initial cylinder pressure of 180 p.s.i. and a piston travel distance of 19 inches, the predicted shock wave pattern should be approximately as depicted in FIGURE 4, in which the point x is the theoretical point at which all energy is expended and the equalizer valve is open. It should be noted that by changing the velocity at impact, the piston travel and the interval cylinder pressure, the peak G-force and the increment of time may be varied as desired.

In order to disclose the nature of the present invention, a specific embodiment has been described in detail. It should, however, be understood that this has been done for the sole purpose of illustrating by means of a specific example, the basic principles involved and that such embodiment is not intended either to delineate the breadth of the invention or to restrict the scope of the appended claims.

What is claimed is:

1. An assembly for determining deceleration factors of a moving body comprising:
    a cylinder having a floating piston therein and an airtight closure at one end,
    pressure-limiting outlet means connected to said cylinder to bleed off air when the pressure reaches a predetermined value,
    a piston rod slidable through the closure of the cylinder having an impact plate on the end outside the cylinder and a striking cup on the end within the cylinder,
    said impact plate having rods parallel to and guiding the piston rod,
    means on the outside of the cylinder for limiting in both directions the stroke of the guide rods and the piston,
    said assembly on impact with a moving body adapted to decelerate said body to a stop before the piston reaches the limit of its stroke to provide means necessary for calculation of unknown factors of the moving body.

2. An assembly as recited in claim 1 wherein the capacity is increased for heavier loads by the addition of sufficient cylinders whose action is unified to prevent the co-acting pistons from reaching the limit of their strokes.

3. An assembly as recited in claim 1, wherein the cylinder is positioned in the same axis as the moving load.

4. An assembly as recited in claim 3 wherein the capacity is increased for heavier loads by the addition of sufficient cylinders whose action is combined to prevent the respective pistons from reaching the limit of their strokes.

5. An assembly for determining deceleration factors of a moving body comprising:
    an airtight cylindrical casing closed at one end having pressure-limiting outlet means and an adjustable impact trip secured in said end and protruding inwardly,
    a closure for the opposite end of the cylinder having an opening in the center thereof,
    said enclosure having a periphery extending beyond the cylinder walls provided with openings adjacent the periphery adapted to act as guides,
    a floating piston having a flanged periphery and an axial bore slidable within said cylinder,
    a pressure equalizer valve within said axial bore adapted to be opened on contact with the impact trip at the end of the piston stroke,
    a hollow piston rod slidable within the opening of the cylinder closure,
    said piston rod having a cup-shaped striking plate on the end within the cylinder adapted when activated to contact the piston,
    the cup of the striking plate having an interior diameter greater than the bore of the piston and exterior diameter smaller than the inner periphery of the piston to provide outlet ports for air on opening of said pressure equalizer valve, openings in the cylinder casing communicating with said outlet ports to permit bleeding air from either side of said piston, an impact plate of larger diameter than the cylinder attached to the outside end of the piston rod adapted to receive the force of a moving body, guide rods attached to the outer periphery of the impact plate slidable through the openings in the periphery of the cylinder closure and having a travel limit member on the opposite end, a travel stop ring around the outside of the cylinder adjacent the closure for engagement with the travel member of the guide rod to limit the outward movement of the piston rod, an adjustable travel stop ring around the cylinder adjacent the opposite end adapted to limit the inward movement of the guide rod and the piston rod and said assembly on impact with a moving body adapted to decelerate said body to a stop before the piston reaches the limit of its stroke.

6. An assembly as recited in claim 5, wherein the movement of the pistons in the cylinders is in axial alignment with the moving load.

References Cited

UNITED STATES PATENTS 2,997,025  8/1961  Ottestad et al. _____ 121—38

OTHER REFERENCES

Consolidated Electrodynamics Corp.: Bulletin 4–70, 73/23.1, pp. 4, 5, 6, 7, and 9.

RICHARD C. QUEISSER, *Primary Examiner.*

VICTOR J. TOTH, *Assistant Examiner.*

U.S. Cl. X.R.

188—1